United States Patent [19]

Ford

[11] Patent Number: 5,200,973
[45] Date of Patent: Apr. 6, 1993

[54] TOROIDAL CATHODE

[75] Inventor: Carol M. Ford, Columbia Heights, Minn.

[73] Assignee: Honeywell Inc., Minneapolis, Minn.

[21] Appl. No.: 712,174

[22] Filed: Jun. 7, 1991

[51] Int. Cl.$^5$ .............................................. H01S 3/097
[52] U.S. Cl. ...................................... 372/87; 372/94; 372/55; 356/350
[58] Field of Search ...................... 372/94, 87; 356/350

[56] References Cited

U.S. PATENT DOCUMENTS 5,052,012  9/1991  Norvell .................................. 372/94

Primary Examiner—Léon Scott, Jr.
Attorney, Agent, or Firm—Ronald E. Champion

[57] ABSTRACT

A cathode for use in a gas discharge device that is resistant to sputtering and therefore extends the life of the gas discharge device. The configuration of the cathode effectively uses the hollow cathode effect allowing the laser to operate with a lower excitation voltage. That configuration involves a body having a cavity therein and an entrance port to the cavity. Within the cavity there exists a protrusion extending from an interior surface toward the entrance port.

21 Claims, 3 Drawing Sheets

TOROIDAL CATHODE

BACKGROUND OF INVENTION

The present invention relates to a cathode used in a gas discharge device. Specifically, the invention relates to the configuration of a cathode that extends cathode life and in turn extends the life of gas discharge devices.

Gas discharge devices are used for a number of purposes, one of which is a laser. Gas lasers are constructed to allow the excitation of a gas, such as Helium-Neon, which in turn pumps electrons into high energy states. When the electrons decay or are stimulated to fall back to their original state, the atom emits photons which make up the laser light.

One form of a laser is a ring laser used as an angular rate sensor. Ring laser angular sensors are well known in the art and are specifically described in U.S. Pat. No. 3,373,650 to Killpatrick, and U.S. Pat. No. 3,390,606 to Podgorski.

A gas discharge device generally comprises a chamber containing a gas, at least one anode and at least one cathode attached thereto. The chamber is generally formed out of a glass tube or block or the like. An electrical potential applied between the anode and the cathode causes electrons to pass through the gas filled cavity thus ionizing the gas. This ionized gas is then capable of maintaining a gas discharge, (i.e., allowing a discharge current to pass from the anode to the cathode).

In a gas discharge device ionized gas atoms (ions) are attracted to the negatively charge cathode. When these ions collide with the surface of the cathode, electrons are released creating a discharge current that passes through the gas filled cavity.

A well known problem related to cathodes used in gas discharge devices is sputtering. When high energy ions collide with the cathode surface occasionally cathode material molecules are dislodged from the cathode surface. This occurrence is known as sputtering and can adversely effect the life of the gas discharge device. This problem is particularly troublesome in gas discharge devices used as lasers since loss of gas molecules will cause the laser to be extinguished. Dislodged cathode material molecules can trap or bury gas atoms beneath the surface of the cathode. This reduces the number of gas atoms available for maintaining a gas discharge.

The gas filled cavity is generally closed having a limited amount of gas therein. When sputtering occurs, the overall amount of gas is reduced due to the gas atoms being lodged beneath the cathode surface. If sputtering continues, eventually there will not be enough gas to support the discharge. Therefore, sputtering has very adverse effects on the life of the gas discharge.

The prior art has utilized a metallic cathode (primarily aluminum) with an oxide layer placed on the electron emitting surface. This process helps to reduce sputtering because the oxide surface is generally harder than the metallic material of the cathode. However, high concentrations of ion flow (high current density) develops in particular areas on the surface of the cathode due to irregularities in that surface, thus causing the oxide layer to breakdown. The breakdown of the oxide layer causes sputtering to occur in these areas. The problem of high current density may occur in almost all cathodes whether they have an oxide layer or not.

Another approach to eliminate the problem of sputtering is to use a cathode with a curved interior surface. High current density typically occurs on portions of the cathode surface that are discontinuous (e.g. corners, sharp points). By having curved interior surfaces, the build up of high current density in particular areas of the cathode surface is reduced.

A further approach of the prior art to reduce sputtering is to embed discharge gas molecules in the cathode surface prior to sealing the cavity. This causes an exchange of discharge gas atoms as opposed to the capture of gas atoms (e.g. when a gas atom is lodged in the cathode surface, it will be likely to knock out a previously lodged gas atom.) The added number of discharge gas atoms available extends the life of the gas discharge. An example of this approach is shown in U.S. Pat. No. 4,853,940 to Ford et al.

Different geometries of the discharge cavity can effect the operation of the gas discharge. Specifically, the configuration of the cavity and the electrodes (cathode and anode) can change the electrical potential required to maintain the gas discharge. This process is known in the art as the hollow cathode effect and is described in three publications by D. J. Sturges and H. J. Oskum, J. of Applied Physics No. 35 (1964), J of Applied Physics No. 37 (1967) and Physics, No. 37 (1967).

Using hollow cathode effect, secondary electron emission is maximized. When an ion - electron interchange occurs at the surface of the cathode, an instability in the cathode material is created. This instability allows for the emission of a second electron (a secondary electron).

SUMMARY OF THE INVENTION

An object of the present invention is to provide a cathode that will be resistant to sputtering and will also increase the life of a gas discharge device. More specifically, the cathode will help to increase the life of gas discharge devices used in laser applications.

A further object of the present invention is to provide a cathode with a configuration that provides a large surface area for the emission of electrons, as well as continuous surfaces on the functional portion of the cathode. This configuration provides for a lower current density throughout the functional surface of the cathode, and reduces the chance of sputtering.

The cathode of the present invention is used in a gas discharge device. The cathode consist of a body having a cavity therein. This cavity has an opening on a surface of the cathode body. Within the cavity is a protrusion extending from an interior surface toward the opening of the cavity.

Other objects and advantages of the present invention will be apparent from the following description of the preferred embodiment and from the attached drawing.

BRIEF DESCRIPTION OF THE DRAWING

The present invention may be better understood by reading the following description of the preferred embodiment along with the drawing in which.

DESCRIPTION OF THE PREFERRED EMBODIMENT

Figure 1:
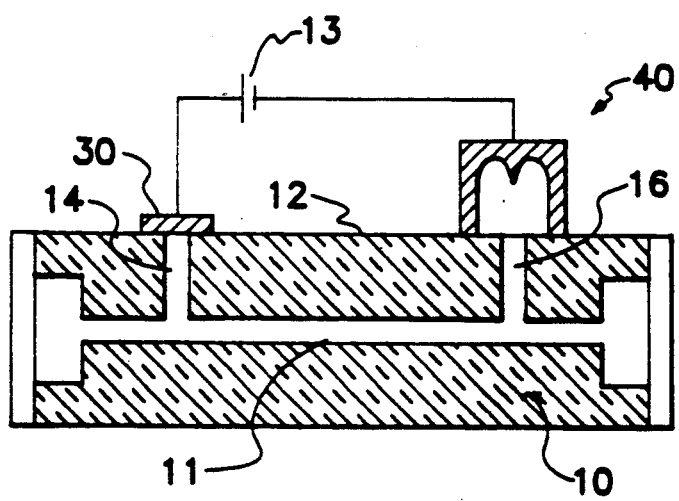
FIG. 1 illustrates in cross-section, the parts of a typical gas discharge device.

Referring to FIG. 1, a gas discharge device is comprised of a body illustrated as a block 10, with a gas filled chamber or cavity 11 therein, an anode 30 and a cathode 40. Cathode 40 and anode 30 are attached to block 10 on an outer surface 12. Anode 30 and cathode 40 must be attached to block 10 so as to form a gas tight seal thus maintaining the gas in gas filled cavity 11. Anode 30 and cathode 40 communicate with the gas in gas filled chamber 11 via bores 14, 16 extending from surface 12 of block 10 to cavity 11. Connected between anode 30 and cathode 40 is a direct current voltage source 13.

Block 10 is typically made of a non metallic material such as glass or Zerodur. These materials have very low coefficients of thermal expansion causing block 10 to be very stable over a large range of temperatures.

Anode 30 and cathode 40 are generally made of a metal that has good electron emission properties. As a minimum anode 30 and cathode 40 will have electrically conductive surfaces having good electron emission properties. Typically, this metal is invar aluminum, beryllium, or niobium.

Figure 2:
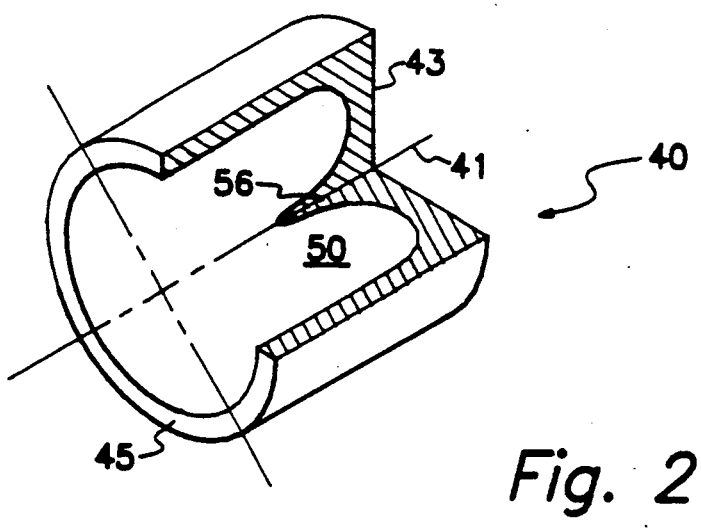
FIG. 2 is a three dimensional diagram of the cathode described in the preferred embodiment.
Figure 3:
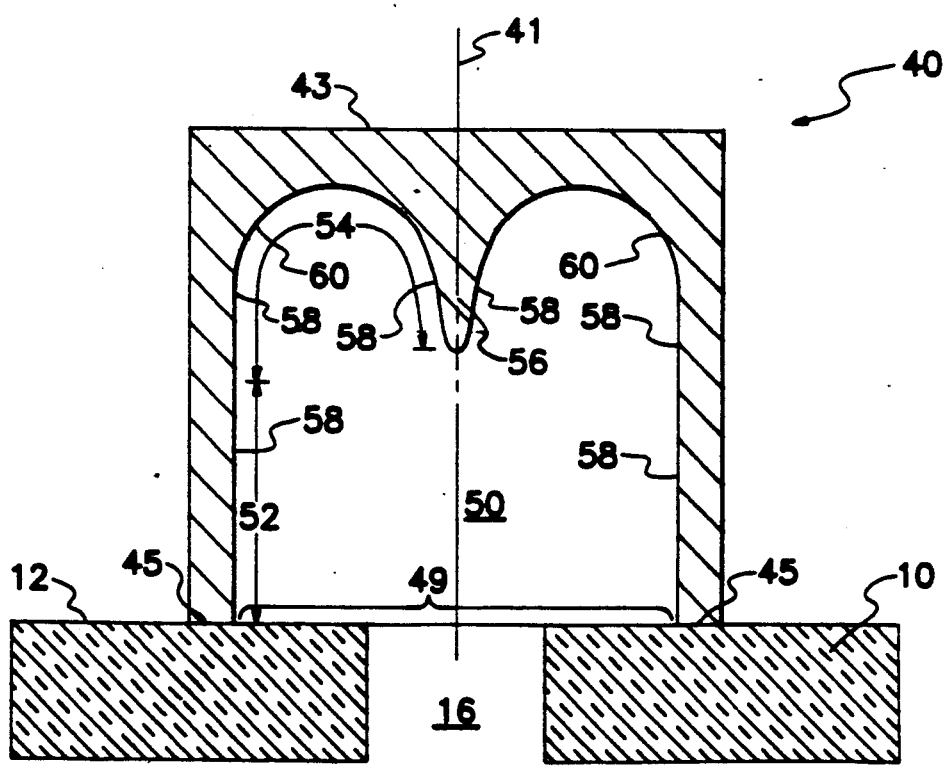
FIG. 3 is a cross-sectional view of the cathode described in the preferred embodiment.

Referring now to FIGS. 2 and 3, cathode 40 of the present embodiment is a body with a cavity 50 therein. Cathode 40 has an opening 49 on an exterior surface 45 that extends into cavity 50. The interior wall 58 of cavity 50 are electrically conductive to facilitate electron emission. Within cavity 50 a protrusion 56 extends from an interior surface 58 toward opening 49.

In the preferred embodiment cathode 40 is configured as a right circular cylindrical member. Cathode 40 has a first end surface 43 perpendicular to a central axis 41 of the right circular cylinder. Similarly, a second end surface 45 is perpendicular to central axis 41. At the second end surface 45 is opening 49 to cavity 50. Cavity 50 begins at second end surface 45 and extends into cathode 40. Interior surface 58 of cathode 50 extends toward first end 43. An initial portion 52 of interior surface 58 of hollow cavity 50 is also configured as a right circular cylindrical. An upper portion 54 of cavity 50 is somewhat bowl shaped or dome shaped having rounded corners 60 with a protrusion 56 extending from the surface of upper portion 54 towards opening 49. Interior working surface 58 of cavity 50 is a continuous surface with all corners or contours being rounded or curved.

Protrusion 56 extends along central axis 41 toward opening 49. Differing configurations can be used to accomplish the same results. For example, protrusion 56 could be off center, or could be aligned differently.

In operation the cathode 40 of the preferred embodiment exhibits many desirable characteristics. The configuration of interior surface 58 provides for a large amount of surface area in relation to the overall size of cathode 50. The large amount of surface area reduces the current density at any particular area on interior surface 58 of cathode 40. Lower current density causes cathode 40 to be more resistant to the problem of sputtering. Additionally, since interior surface 58 of cathode 40 is continuous, current density "hot spots" are eliminated further reducing the possibility of sputtering.

Testing has indicated that cathode 40 fully utilizes all surface area available. In other configurations, the cathode will not use all of the surface, especially the upper portions. This increases the current density in the portion of the cathode that is used. Tests have shown that upper portions 54 of interior surface 58 is fully utilized in the electron emission process. Therefore, the electron emission process is distributed over all available surface area.

The configuration of the interior surface 58 also avoids a high concentration of direct collisions between a high energy positive ion and interior surface 58. The high energy ions are not allowed to approach the surface at a trajectory that is perpendicular with the cathode surface. This causes the ion collisions to be less destructive.

The indirect collisions of the incoming ions also helps to stimulate secondary electron emission. When an ion approaches cathode surface 58 at angle that is close to parallel with surface 58, an instability is created on surface 58 in the area of the collision. This instability will often result in the emission of another electron (i.e., a secondary electron).

Cathode 40 creates a hollow cathode effect discharge. The hollow cathode of the present invention is intended to be operated under conditions to produce the hollow cathode effect as particularly described in the Applied Physics paper No. 35. Specifically, paper No. 35, states "above a critical gas pressure that depends on the type of gas and on the discharge current, the discharge will take place almost entirely from the interior of the cavity. A transition is accomplished by a marked increase in the discharge current for a given voltage across the discharge tube. The phenomenon is known as the hollow cathode effect". Further, Applied Physics paper No. 37 shows the hollow cathode effect as a function of gas discharge pressure and the geometry of the cathode configuration. Particularly, it shows that the discharge voltage (discharge current) is related to the gas pressure multiplied by the plate separation of a pair of planar cathode.

In the preferred embodiment the exterior configuration of the cathode is not important as long as the internal cavity surface is configured in accordance with the previously described configuration. This is due to the fact that the electron interchange process occurs on the interior surface. The dimensions of the particular cathode will be dependant upon the type of laser being used and the characteristics of the gas filled cavity. Those characteristics include the type of gas, the pressure of the gas, the volume of gas and the shape of the gas filled.

Figure 4:
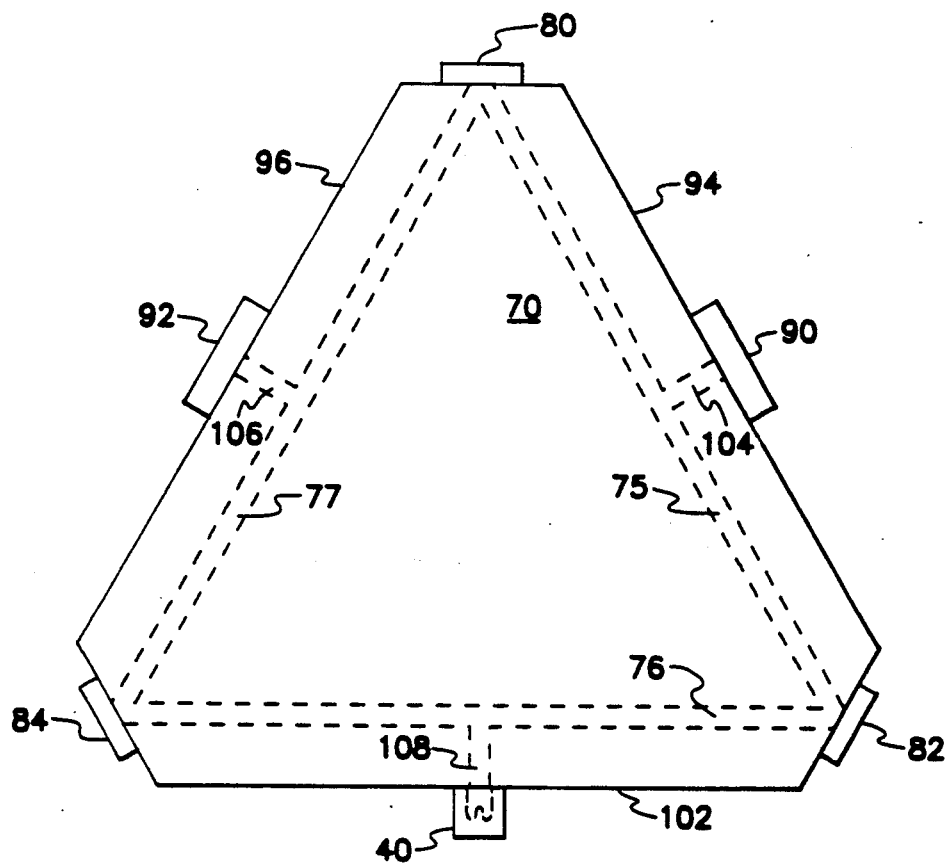
FIG. 4 illustrates the configuration and layout of a ring laser gyro.

Referring to FIG. 4 a laser gyroscope is constructed from a block 70 which is typically nonmetallic and has a low coefficient of thermal expansion. Block 70 is made in the shape of a triangle. Other polygon configurations are within the scope of the present invention. Block 70 has three interconnecting tunnels 75, 76 and 77 within. Tunnels 75, 76, 77 contain a gas capable of supporting a gas discharge current or gas discharge laser. Together, tunnels 75, 76, 77 create a gas filled chamber or cavity. On the corners of the triangular shape are attached mirrors 80, 82, 84. Mirrors 80, 82, 84 facilitate the reflection of light beams around the gas filled tunnels 75, 76, 77 within block 70.

Communicating with the gas in the gas filled tunnels 75, 76, 77 are two anodes 90 and 92 mounted halfway along two sides 94, 96 of block 70 and a cathode 40 mounted halfway along the remaining side 102. Cathode 40 is the cathode of the preferred embodiment shown in FIGS. 2 and 3 and previously disclosed. Anodes 90 and 92 and the cathode 40 are connected to block 70 a gas tight manner, as are mirrors 80, 82, 84. Communication by anodes 90, 92 and cathode 40 with the cavity is achieved through bores 104, 106 and 108 extending from the block surfaces 94, 96 and 102 to respective tunnels 75, 76, and 77.

Figure 5:
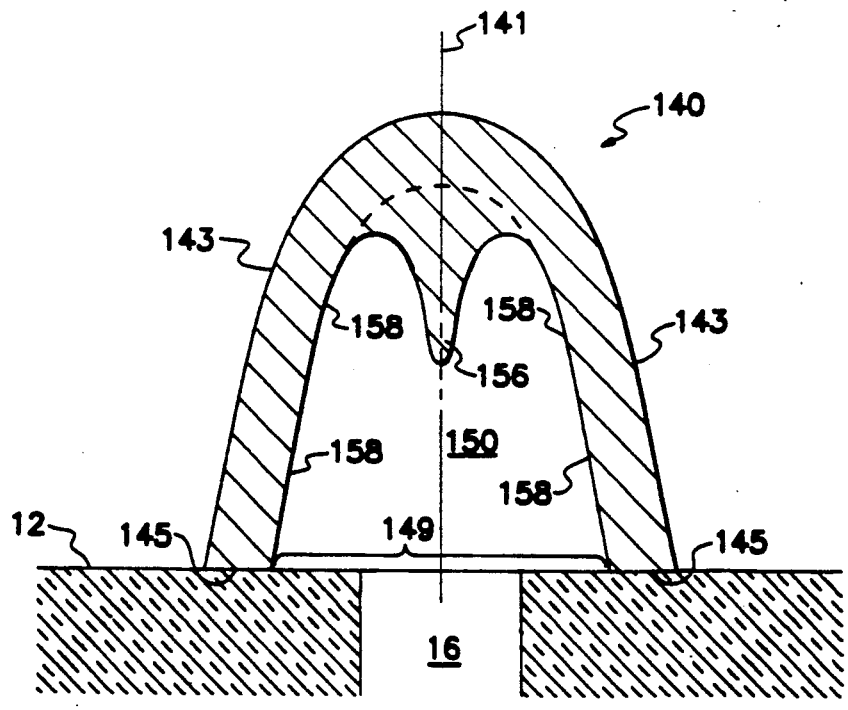
FIG. 5 is a cross-sectional view of a second embodiment of the cathode of the present invention.

Referring to FIG. 5, an alternative embodiment of the present invention is a cathode 140 being dome shaped with an opening 149 on an exterior surface 145 of cathode 140. Opening 149 opens to a cavity 150. The interior surfaces 158 of cavity 150 are shaped in a circular dome fashion with a central protrusion 156 extending from interior surface 158 toward opening 149. Protrusion 156 extends along a reference axis 141 of the circular dome shape which intersects interior surface 158 and opening 149.

The interior configuration of this alternative embodiment provides all of the same advantages of the preferred embodiment. A large amount of surface area is provided in relation to the overall size of cathode 140. Consequently, during the electron emission process a large amount of surface area is provided resulting in lower current density and thus sputtering is reduced. Additionally, a hollow cathode effect discharge is created with this embodiment also.

Again, the shape of the exterior surface 143 is irrelevant because electron emission takes place on the interior surface 158. This cathode is also mounted to the outer surface 42 of block 10. Communication with gas filled cavity 11 is achieved through bore 48.

Having illustrated and described the principles of the invention in a preferred embodiment, it should be apparent to those skilled in the art that the invention can be modified in arrangement and detail without departing from such principles. We claim all modifications coming within the spirit and scope of the following claims.

What is claimed is:

1. A cathode for a laser, wherein the laser includes at least one cathode and one anode, and said laser includes a gas filled chamber with a bore extending from the outer surface of the laser to the gas filled chamber, said cathode comprising:
    a body providing a cavity for containing an active gas, said body including an opening to said cavity within said body, interior wall surfaces defining said cavity and in which said interior wall surfaces are electrically conductive, and a mounting surface surrounding said opening for permitting attachment to said laser such that said cathode body opening is aligned with said bore of said laser block such that gas contained in said laser block is in communication with the cavity of said cathode; and
    a protrusion within said cavity positioned on a selected portion of the interior wall surfaces of said cavity extending towards said opening in a direction substantially parallel to the longitudinal axis of the bore whereby the protrusion is substantially parallel to the path of incoming ions emitted from the gas filled chamber during the operation of the laser.

2. The cathode of claim 1 wherein said interior wall surfaces include at least in part a right circular cylindrical wall surfaces, and in which said cylindrical wall surfaces inwardly extend substantially from said opening.

3. The cathode of claim 2 wherein said protrusion is a conically shaped protrusion having a rounded tip.

4. The cathode of claim 2 wherein said protrusion extends along a reference axis in parallel with said cylindrical interior wall surfaces and toward said opening.

5. The cathode of claim 1 wherein said interior wall surfaces of said cavity form substantially a continuous surface whereby there is an absence of discontinuities.

6. The cathode of claim 1 wherein said body includes a mounting surface surrounding said opening for permitting attachment to a laser block, such that said opening is in communication with an opening in said laser block whereby gas contained in said laser block is in communication with said cavity.

7. The cathode of claim 1 wherein said protrusion is a conically shaped protrusion having a rounded tip.

8. A cathode for a ring laser gyro wherein said gyro includes at least one cathode and one anode, and said laser gyro includes a laser block containing a gas filled chamber with a bore extending from an outer surface of said block to said gas filled chamber, said cathode comprising:
    a body providing a cavity for containing an active gas, said body including an opening to said cavity within said body, interior wall surfaces defining said cavity and in which said interior wall surfaces are electrically conductive, and a mounting surface surrounding said opening for permitting attachment to said block such that said cathode body opening is aligned with said bore of said block such that gas contained in said block is in communication with the cavity of said cathode; and
    a protrusion within said cavity positioned on a selected portion of the interior wall surfaces of said cavity extending towards said opening in a direction substantially parallel to the longitudinal axis of said bore whereby the protrusion is substantially parallel to the path of incoming ions emitted from the gas filled chamber during the operation of the laser.

9. The cathode of claim 8 wherein said interior wall surfaces include at least in part right circular cylindrical wall surfaces, and in which said cylindrical wall surfaces inwardly extend substantially from said opening.

10. The cathode of claim 9 wherein said protrusion extends along a reference axis in parallel with said cylindrical interior wall surfaces and toward said opening.

11. The cathode of claim 9 wherein said protrusion is a conically shaped protrusion having a rounded tip.

12. The cathode of claim 8 wherein said cavity interior wall surfaces of said cavity form substantially a continuous surface whereby there is an absence of discontinuities.

13. The cathode of claim 8 wherein said protrusion is a conically shaped protrusion having a rounded tip.

14. The cathode of claim 8 wherein said protrusion causes the avoidance of high current density hot spots and wherein said protrusion enables the cathode to effectively operate at a lower charge potential.

15. A gas discharge device comprising:
    a first body containing a gas filled chamber, wherein the first body includes a bore which passes from the gas filled chamber to the outer surface of the first body;
    a first anode attached to said first body in communication with said gas filled chamber;
    a first cathode attached to said first body in communication with said gas filled chamber including:

a second body providing a cavity for containing an active gas, said body including an opening to said cavity within said second body, interior wall surfaces defining said cavity in which said interior wall surfaces are electrically conductive, and a mounting surface surrounding said opening for permitting attachment to said first body such that said opening is aligned with said bore of said first body such that gas contained in said first body is in communication with the cavity of said second body; and a protrusion within said cavity positioned on a selected portion of the interior wall surfaces of said cavity extending towards said opening in a direction substantially parallel to the longitudinal axis of said bore whereby the protrusion is substantially parallel to the path of incoming ions emitted from the gas filled chamber during the operation of the gas discharge device.

16. The cathode of claim 15 wherein said interior wall surfaces include at least in part right circular cylindrical wall surfaces, and in which said cylindrical wall surfaces inwardly extend substantially from said opening.

17. The cathode of claim 16 wherein said protrusion is a conically shaped protrusion having a rounded tip.

18. The cathode of claim 16 wherein said protrusion extends along a reference axis in parallel with said cylindrical interior wall surfaces and toward said opening.

19. The cathode of claim 15 wherein said cavity interior wall surfaces of said cavity form substantially a continuous surface whereby there is an absence of discontinuities.

20. The cathode of claim 15 wherein said cathode body includes a mounting surface surrounding said opening for permitting attachment to a laser block, such that said opening is in communication with an opening in said laser block whereby gass contained in said laser block is in communication with said body cavity of said cathode.

21. The cathode of claim 15 wherein said protrusion is a conically shaped protrusion having a rounded tip.

* * * * *